US007844164B2

(12) United States Patent
Sung et al.

(10) Patent No.: US 7,844,164 B2
(45) Date of Patent: Nov. 30, 2010

(54) METHOD OF SETTING RECORDING END RESERVATION TIME FOR INSTANT RECORDING IN DIGITAL VIDEO RECORDER

(75) Inventors: Ki-Yeon Sung, Anyang-si (KR);
Young-Seop Han, Suwon-si (KR);
Joon-Oo Kim, Suwon (KR)

(73) Assignee: Samsung Electronics Co., Ltd.,
Maetan-Dong, Yeongtong-Gu, Suwon-Si,
Gyeonggi-Do (KR)

( * ) Notice: Subject to any disclaimer, the term of this patent is extended or adjusted under 35 U.S.C. 154(b) by 1121 days.

(21) Appl. No.: 11/514,477

(22) Filed: Sep. 1, 2006

(65) Prior Publication Data

US 2007/0053656 A1    Mar. 8, 2007

(30) Foreign Application Priority Data

Sep. 2, 2005    (KR)    ...................... 10-2005-0081877

(51) Int. Cl.
*H04N 5/91* (2006.01)
*H04N 7/08* (2006.01)
(52) U.S. Cl. .......................................... 386/83; 386/92
(58) Field of Classification Search .................. 386/83, 386/92, 46, 52, 124, 125; 725/87, 97, 88
See application file for complete search history.

(56) References Cited

U.S. PATENT DOCUMENTS

2001/0033736 A1* 10/2001 Yap et al. ...................... 386/46
2005/0198677 A1*  9/2005 Lewis .......................... 725/87

FOREIGN PATENT DOCUMENTS

KR        2002-81781        10/2002

* cited by examiner

*Primary Examiner*—Robert Chevalier
(74) *Attorney, Agent, or Firm*—Cha & Reiter, LLC

(57) ABSTRACT

Disclosed is a method of setting a recording end reservation time for instant recording in a Digital Video Recorder (DVR) of a received digital broadcast. The method includes steps of selecting an instant recording function, creating an OSD window for displaying at least one preset invariable recording end reservation time to display the preset invariable recording end reservation time, analyzing PSIP information from the received digital broadcast and extracting "available program information" including information about a time to terminate the digital broadcast program intended to be recorded at present, setting the recording end reservation time through the OSD window when the "available program information" does not exist, and adding to the OSD window a setup item to enable setting by a user of a recording end reservation time, and setting the recording end reservation time through the OSD window having the added setup item when the "available program information" exists.

4 Claims, 5 Drawing Sheets

RECORDING END
RESERVATION TIME

⦿ 30 MINUTES

○ 1 HOUR

○ 2 HOURS

○ UNLIMITED

FIG.3

RECORDING END
RESERVATION TIME

○ 30 MINUTES

○ 1 HOUR

○ 2 HOURS

○ UNLIMITED

⦿ WHEN CURRENT
PROGRAM IS TERMINATED

FIG.5

METHOD OF SETTING RECORDING END RESERVATION TIME FOR INSTANT RECORDING IN DIGITAL VIDEO RECORDER

CLAIM OF PRIORITY

This application claims priority to an application entitled "Method Of Setting Recording End Reservation Time For Instant Recording In Digital Video Recorder," filed in the Korean Industrial Property Office on Sep. 2, 2005 and assigned Serial No. 2005-0081877, the entire contents of which are hereby incorporated by reference as if set forth herein.

BACKGROUND OF THE INVENTION

1. Field of the Invention

The present invention relates to a Digital Video Recorder (DVR) such as a Personal Video Recorder (PVR), and more particularly to a method of setting a recording end reservation time for a program of interest when an instant recording function is selected in a DVR.

2. Description of the Related Art

As the distribution of digital broadcast has become wider, a Personal Video Recorder (PVR) or a Digital Video Recorder (DVR) has increasingly replaced the conventional Video Tape Recorder (VTR) in advanced digital set-top boxes.

FIG. 1 illustrates a configuration of an embodiment of an ordinary DVR.

Referring to FIG. 1, the DVR includes a digital broadcasting receiver 11 that receives a broadcast signal from the outside and demodulates the received broadcast signal into a video signal, a digital broadcasting processor 12 that receives, decodes and outputs the video signal from the digital broadcasting receiver 11, a broadcasting output unit 13 that outputs the decoded video signal through video and audio output devices, a user input unit 16 that receives control commands of the whole DVR, broadcasting selection information, etc. from a user, an On Screen Display (OSD) processor 15 that provides a screen for the setup of the DVR according to the selection of a user, and a controller 14 that receives the inputs of the user through the user input unit 16 and performs overall control on the DVR on the basis of the received inputs. Especially, in the case of receiving general broadcasting, the controller 14 receives channel selection information etc. through the user input unit, and changes a frequency of the digital broadcasting receiver to thereby change a channel.

When control operation is required, a required OSD window is received through the OSD processor 15, sent to the digital broadcast processor 12, and displayed to a user. Then, when any selection of the user is input through the user input unit 16, the control operation based on the selection is performed.

Meanwhile, when a recording function is selected during the control operation, a video signal is received from the digital broadcasting processor 12 and stored in a storage 17. Then, the controller looks up the stored video signals, selects any one of the video signals looked up, and outputs the selected video signal. Specifically, when a playback function is selected, the controller 14 enables the OSD window for looking up a list of the video signals stored in the storage 17 to be created by the OSD processor 15, and outputs the created OSD window through the digital broadcasting processor 12. Then, when the user selects any one from the video signals on the output OSD window, the controller extracts the selected video signal from the storage 17, and sends the extracted video signal to the digital broadcasting processor 12, thereby causing the sent video signal to be output.

Here, when an instant recording function for directly storing the digital broadcast that is being output at present is selected, the related operation will be described with reference to FIG. 2.

FIG. 2 is a flowchart of an embodiment of a method for performing instant recording in a conventional DVR.

Referring to FIG. 2, first, when a user selects an instant recording function during reception of digital broadcast at step 21, an OSD window for displaying recording end reservation times, which are preset invariable times, is created through the OSD processor, and then displayed at step 22.

Any one of the recording end reservation times displayed on the created OSD window is selected by the user at step 23.

The recording of the digital broadcast of interest is started, and whether or not the selected recording end reservation time has been reached is determined at step 25. If the selected recording end reservation time has been reached, the recording is terminated at step 26.

FIG. 3 illustrates an OSD window for displaying recording end reservation times, which are preset invariable times, provided when an instant recording function is selected in a conventional DVR.

Referring to FIG. 3, when a user wants to perform an instant recording function during reception of digital broadcast, an OSD window is displayed, by the digital broadcasting output device, asking how much time it will take to record a program of interest prior to the instant recording. Thus, the user selects any one of the preset recording end reservation times on the OSD window, thereby performing manual designation of recording for a given time.

At this time, the intervals of time are marked with "30 minutes, " "one hour," "two hours, " and "Unlimited."

When the instant recording function is performed based on this conventional art, the recording end reservation time is set to the invariable time such as "30 minutes," "one hour," or "two hours," in the case that the user does not know the ending time of the digital broadcast program that is being received at present. Hence, in most cases, the set time is not accurately matched with a real time the program is terminated. If the set time falls short of the real time, the end part of the program is not recorded, so that the user does not obtain the desired effect of recording the entire program. In contrast, if the set time exceeds the real time, the undesired programs or parts thereof, are recorded, so that storage space for the recording is wasted. Further, when the recording end reservation time is set to "Unlimited," the user is inconvenienced by having to terminate the recording after he/she waits until the broadcast program of interest is finished.

SUMMARY OF THE INVENTION

Accordingly, the present invention provides a method of setting a recording end reservation time for instant recording in a Digital Video Recorder (DVR), in which when a current program being received at present is recorded through an instant recording function in the DVR, a selection of "when a current program is terminated" is added to an existing setup menu by automatically extracting a time to terminate the current program, thereby automatically setting the recording end reservation time in a more convenient, efficient manner.

According to an aspect of the present invention, there is provided a method of setting a recording end reservation time for instant recording in a Digital Video Recorder (DVR). The method including the steps of: selecting an instant recording function while the DVR receives a digital broadcast program;

creating an On Screen Display (OSD) window for displaying at least one preset invariable recording end reservation time according to the selection of the instant recording function of the first step; displaying the preset invariable recording end reservation time; analyzing Program Specific Information Protocol (PSIP) information from the received digital broadcast; extracting "available program information" that includes information on a time to terminate the digital broadcast program intended to be recorded at present; when the extracted "available program information" does not exist, setting the recording end reservation time through the OSD window displayed in the second step; when the extracted "available program information" exists, adding a setup item, capable of setting a recording end time according to the information on a time to terminate the digital broadcast program intended to be currently recorded, to the displayed OSD window; and setting the recording end reservation time through the displayed OSD window having the added setup item.

BRIEF DESCRIPTION OF THE DRAWINGS

The above and other features and advantages of the present invention will be more apparent from the following detailed description taken in conjunction with the accompanying drawings, in which:

FIG. 3 illustrates an OSD window for displaying recording end reservation times, which are preset invariable times, provided when an instant recording function is selected in a conventional DVR;

FIG. 5 illustrates an OSD window for displaying recording end reservation times provided when an instant recording function is selected in a DVR, said OSD window modified according to an embodiment of the present invention.

DETAILED DESCRIPTION OF THE INVENTION

Hereinafter, exemplary embodiments of the present invention are described with reference to the accompanying drawings. For the purposes of clarity and simplicity, a detailed description of known functions and configurations incorporated herein are omitted when it may make the subject matter of the present invention rather unclear.

Figure 1:
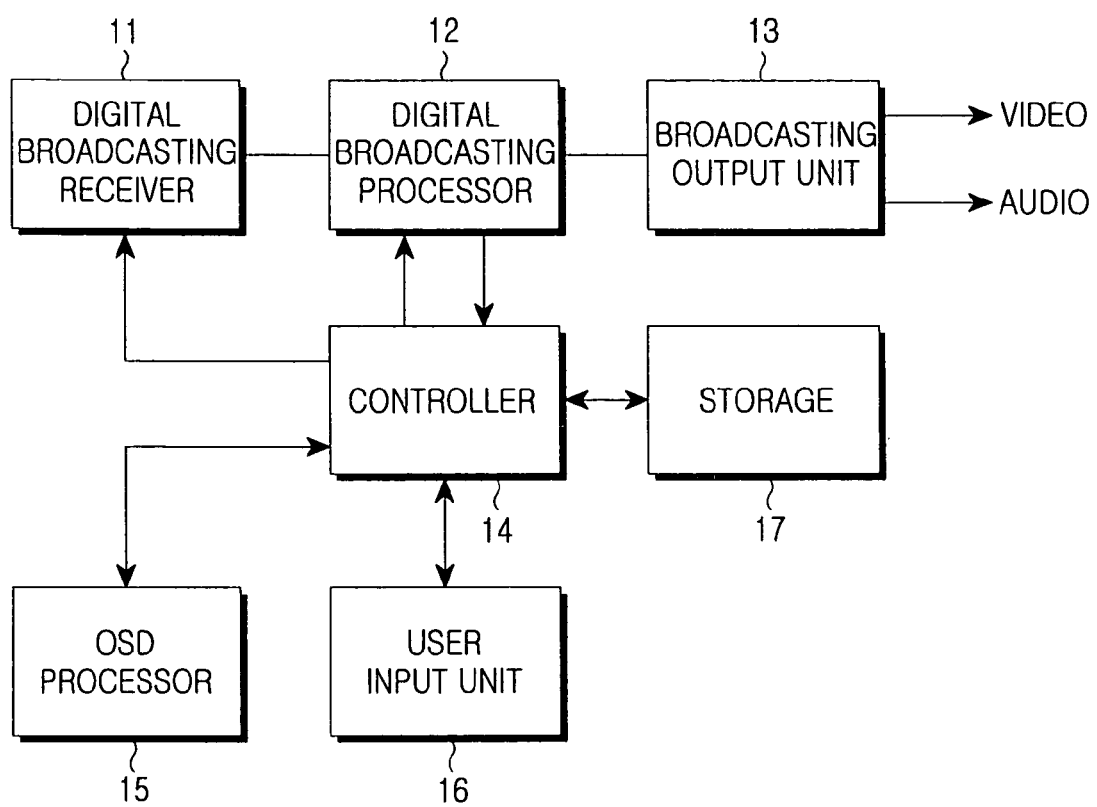
FIG. 1 illustrates a configuration of an embodiment of a conventional DVR.
Figure 2:
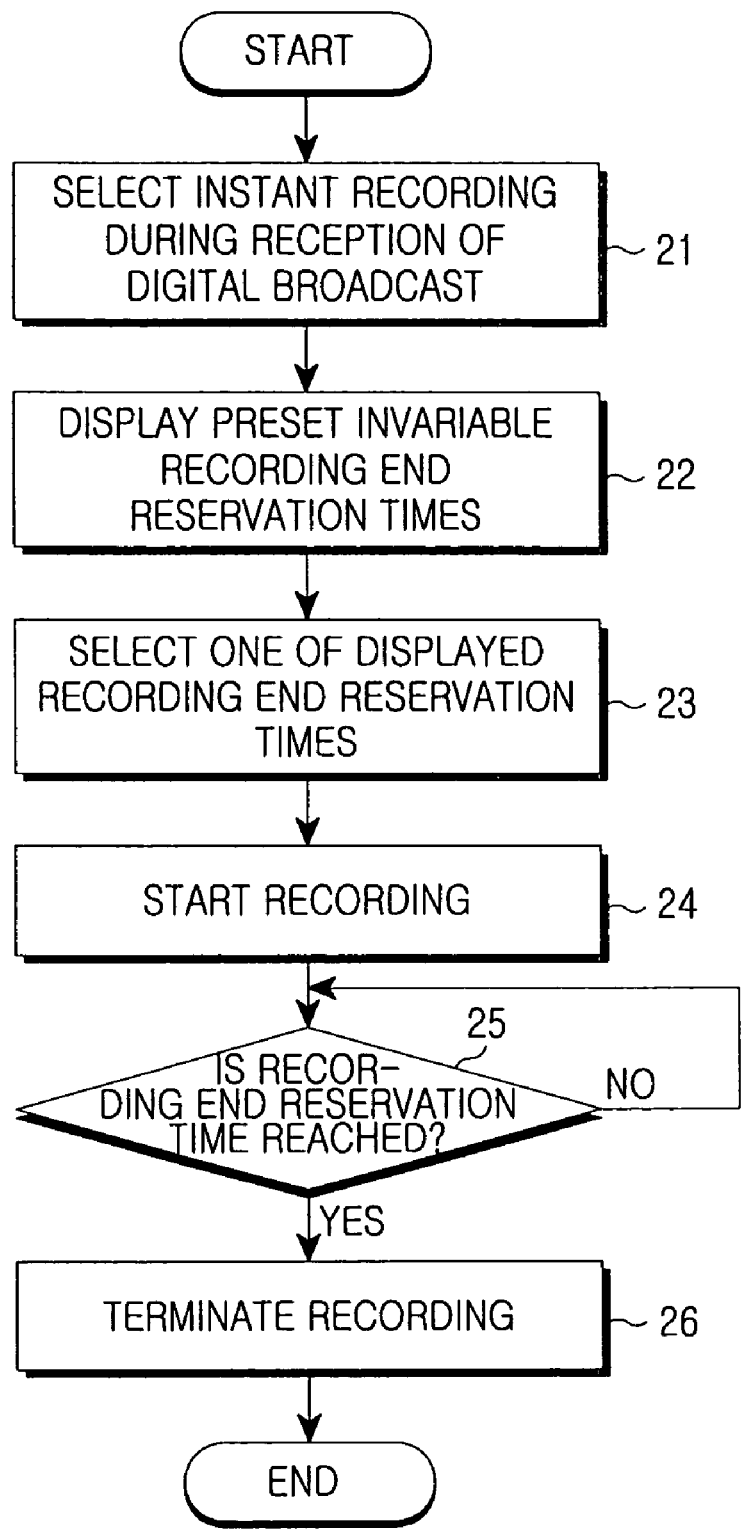
FIG. 2 illustrates a flowchart of an embodiment of a method for performing instant recording in a conventional DVR, according to the present invention.

FIG. 1 illustrates a configuration of an embodiment of a Digital Video Recorder (DVR) to which the present invention is applied.

Referring to FIG. 1, the DVR includes a digital broadcasting receiver 11 that receives a broadcast signal from the outside and demodulates the received broadcast signal into a video signal, a digital broadcasting processor 12 that receives, decodes and outputs the video signal from the digital broadcasting receiver 11, a broadcasting output unit 13 that outputs the decoded video signal through video and audio output devices, a user input unit 16 that receives control commands of the whole DVR, broadcasting selection information, etc. from a user, a storage 17 that stores a recorded video when a recording function is selected, an On Screen Display (OSD) processor 15 that provides a screen for the setup of the DVR according to the selection of a user, and a controller 14 that receives the inputs of the user through the user input unit 16 and performs overall control on the DVR on the basis of the received inputs.

Especially, in the case of receiving general broadcasting, the controller 14 receives channel selection information etc. through the user input unit 16, and changes a frequency of the digital broadcasting receiver to thereby change a channel.

When control operation is required, a required OSD window is received through the OSD processor 15, sent to the digital broadcast processor 12, and displayed to a user. Then, when any selection of the user is input through the user input unit 16, the control operation based on the selection is performed.

Meanwhile, when a recording function is selected during the control operation, the OSD window for recording end reservation times is created by the OSD processor 15, and information about the recording end reservation times is received. Video signals are received from the digital broadcasting processor 12 up to the recording end reservation time of interest, and stored in the storage 17. Then, the controller looks up the stored video signals, selects any one of the video signals looked up, and outputs the selected video signal. Specifically, when a playback function is selected, the controller 14 enables the OSD window for looking up a list of the video signals stored in the storage 17 to be created by the OSD processor 15, and outputs the created OSD window through the digital broadcasting processor 12. Then, when the user selects any one of the video signals on the output OSD window, the controller extracts the selected video signal from the storage 17, and sends the extracted video signal to the digital broadcasting processor 12, thereby causing the sent video signal to be output.

In a preferred embodiment of the present invention, the controller 14 analyzes Program Specific Information Protocol (PSIP) information from the digital broadcasting processor 12, and determines whether the recording end reservation time is added or not through the analyzed information. Here, PSIP refers to a data protocol that is sent from a digital broadcasting station together with a broadcast signal, and particularly a digital broadcast signal. The PSIP allows a digital broadcasting receiver system, such as a DVR according to a preferred embodiment of the present invention, to detect important information about a broadcasting station sending the digital broadcast and a currently broadcast program.

In a preferred embodiment of the present invention, the information about the broadcast program including information on the end time of a broadcast program in this PSIP information is referred to as "available program information."

In other words, the controller 14, according to a preferred embodiment of the present invention, analyzes the PSIP information and extracts the "available program information" from the PSIP information. When the "available program information" is extracted, the controller provides for termination of the recording at the time for termination of the program according to the extracted information.

To this end, when the "available program information" is extracted, a new setup item such as "when current program is terminated" is created and displayed through the OSD processor 15, in addition to the recording end reservation times, which are preset invariable times, previously displayed on the OSD window for the recording end reservation time.

In this case, when the item of "when current program is terminated" is set to the recording end reservation time, broadcasting time end information included in the "available program information" is adopted as the recording end reservation time of interest, and the recording is terminated when a time according to the broadcasting time end information of interest is reached.

Figure 4:
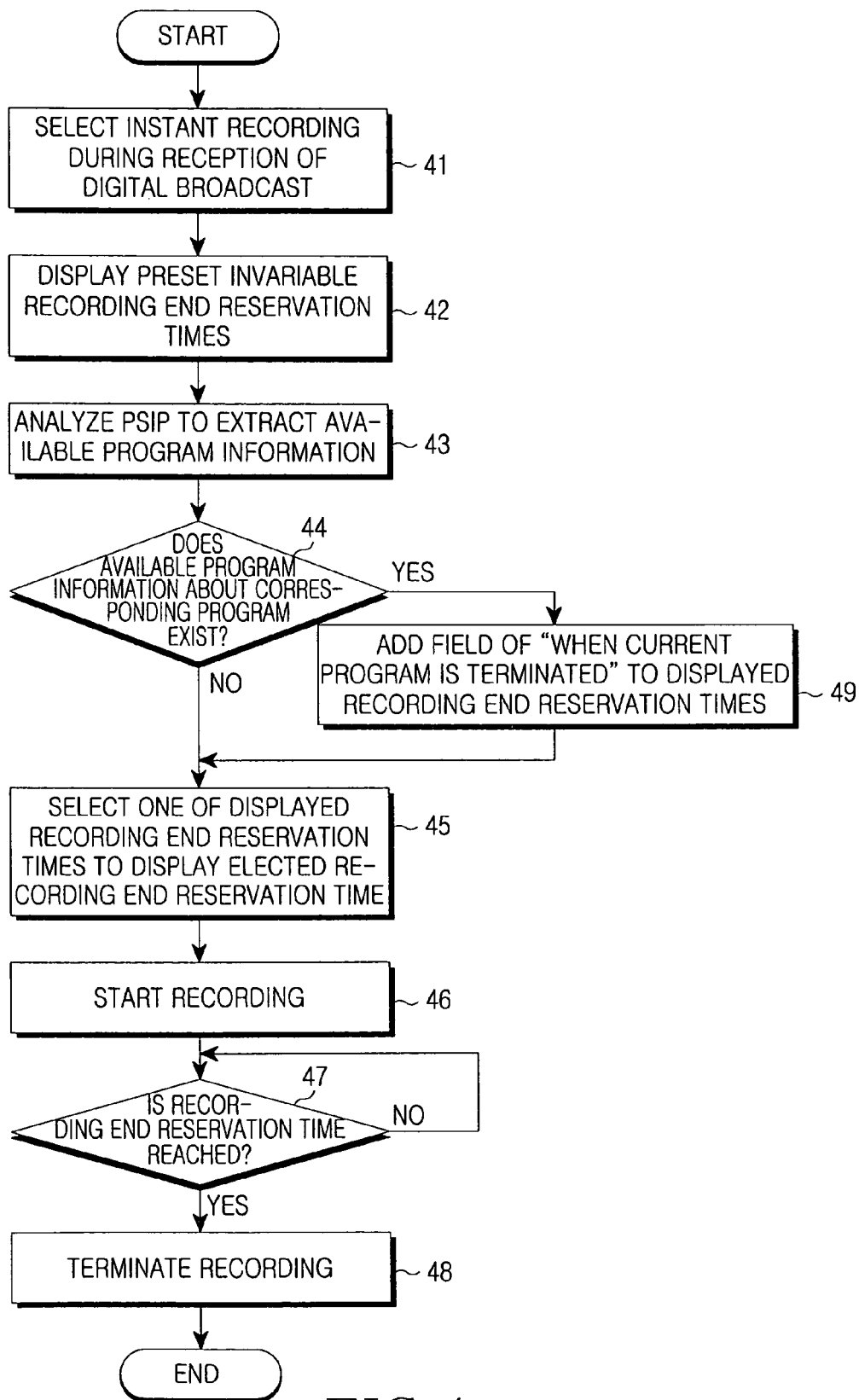
FIG. 4 is a flowchart of an embodiment of a method for performing instant recording in a DVR, according to an embodiment of the present invention.

FIG. 4 is a flowchart of an embodiment of a method for performing instant recording in a DVR, according to a preferred embodiment of the present invention.

Referring to FIG. 4, at step 41 when a user selects an instant recording function during reception of digital broadcast an OSD window for displaying recording end reservation times, which are preset invariable times, is created through the OSD processor, and then displayed at step 42.

A controller of the DVR analyzes PSIP information and then extracts "available program information" from the PSIP information at step 43.

It is determined whether or not there is "available program information" about the corresponding program for which the instant recording is selected, at step 44. When the "available program information" exists, any one of the recording end reservation times displayed on the OSD window created in step S42 is selected by the user at step 45.

The recording of the digital broadcast of interest is started at step 46, and it is determined whether or not the selected recording end reservation time has been reached at step 47. If the selected recording end reservation time has been reached, the recording is terminated at step 48.

Meanwhile, at step 44 it is determined whether or not there is "available program information" about the corresponding program for which instant recording has been selected. When the "available program information" exists, at step 49 a selection of "when current program is terminated" is added and displayed on the OSD window created in step 42. Then, any one of the displayed recording end reservation times can be selected by a user at step 45.

Subsequently, the recording of the digital broadcast of interest is started at step 46, and it is determined whether or not the selected recording end reservation time has been reached at step 47. If the selected recording end reservation time has been reached, the recording is terminated at step 48.

Here, when the added field of "when current program is terminated" is selected, the recording end reservation time is set to a recording end time included in the "available program information". Thereby, the recording end time of a program which the user wants can be automatically set.

Here, the starting of the recording in step 46 has been described to be carried out after the recording end reservation time is set. However, according to another embodiment, the starting of the recording in step 46 may take place immediately after step 41 of selecting the instant recording function, and the following processes of setting the recording end reservation time may be performed after the recording has started.

FIG. 5 illustrates an OSD window for displaying recording end reservation times provided when an instant recording function is selected in a DVR according to an embodiment of the present invention.

Referring to FIG. 5, when a user wishes for an instant recording function during reception of digital broadcast, prior to the instant recording an OSD window is displayed by the digital broadcasting output device for asking how much time it will take to record a program of interest. Thus, the user selects any one of the preset recording end reservation times on the OSD window, thereby performing manual designation so that the selected program is recorded for the selected time.

At this time, the intervals of time are marked with "30 minutes," "one hour," "two hours," and "Unlimited" in the convention system of FIG. 3.

However, in a preferred embodiment of the present invention, in addition to these invariable times, a setup item is added of "when current program is terminated" based on information obtained by analyzing PSIP information.

The method of the present invention as described above can be implemented in a program and stored in a recording medium (e.g. a compact disk read only memory (CD-ROM), a random access memory (RAM), a floppy disk, a hard disk, a magneto-optical disk, or the like) in a computer-readable form.

According to the present invention as described above, in the DVR that records the digital broadcast, when the recording end reservation time for the instant recording is set, the time when the current program is terminated can be automatically extracted and reserved as the recording end reservation time without being set to a preset invariable time, so that it is possible to make use of the DVR more convenient for the user thereof.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of setting a recording end reservation time for instant recording in a Digital Video Recorder (DVR), the method comprising:
    selecting an instant recording function for a digital broadcast program intended to be recorded at present, while the DVR receives the digital broadcast program;
    creating an On Screen Display (OSD) window that displays at least one preset invariable recording end reservation time according to the selected instant recording function;
    analyzing Program Specific Information Protocol (PSIP) information from the received digital broadcast;
    extracting "available program information" including information about a time to terminate the digital broadcast program;
    when the extracted "available program information" does not exist, setting the recording end reservation time through the displayed at least one preset invariable recording end reservation time displayed in the OSD window; and
    when the extracted "available program information" exists, performing the steps of:
        adding a setup item, capable of setting a recording end time according to the information about a time to terminate the digital broadcast program intended to be currently recorded, to the displayed OSD window, and
        setting the recording end reservation time through the displayed OSD window having the added setup item.

2. The method according to claim 1, further comprising the step of recording the selected digital broadcast program as soon as the selecting step is performed.

3. The method according to claim 1, further comprising the step of recording the selected digital broadcast program after a setting step has been performed.

4. The method according to claim 1, further comprising the steps of:
    selecting the added setup item from the displayed OSD window;
    setting the recording end reservation time to the selected item such that the recording end reservation time is the actual time the digital broadcast program ends; and
    terminating the recording in accordance with the set recording end reservation time.

* * * * *